US008520209B2

(12) United States Patent
Chatow et al.

(10) Patent No.: US 8,520,209 B2
(45) Date of Patent: Aug. 27, 2013

(54) ARTICLE, SYSTEM, AND METHOD FOR COLOR MEASUREMENT

(75) Inventors: Ehud Chatow, Palo Alto, CA (US); Melanie M Gottwals, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 12/904,940

(22) Filed: Oct. 14, 2010

(65) Prior Publication Data
US 2012/0092670 A1  Apr. 19, 2012

(51) Int. Cl.
*G01J 3/46* (2006.01)
*H04N 1/04* (2006.01)
*H04N 1/46* (2006.01)
*G03F 3/08* (2006.01)

(52) U.S. Cl.
USPC ........... 356/402; 356/425; 358/504; 358/520; 358/475

(58) Field of Classification Search
USPC ................... 356/300–334, 402–425; 355/32; 358/475, 504, 518, 520; 250/252.1
See application file for complete search history.

(56) References Cited

U.S. PATENT DOCUMENTS

| | | | | |
|---|---|---|---|---|
| 3,177,757 A | * | 4/1965 | Polanyi | 356/41 |
| 3,322,025 A | * | 5/1967 | Dauser | 356/404 |
| 4,681,454 A | * | 7/1987 | Breemer | 356/402 |
| 5,902,994 A | * | 5/1999 | Lisson et al. | 250/208.1 |
| 6,031,617 A | * | 2/2000 | Berg et al. | 356/402 |
| 6,040,923 A | * | 3/2000 | Takashimizu et al. | 358/498 |
| 6,573,991 B1 | * | 6/2003 | Debreczeny et al. | 356/336 |
| 6,627,863 B2 | * | 9/2003 | Wasserman | 250/205 |
| 7,157,681 B1 | * | 1/2007 | Tetzlaff | 250/207 |
| 7,551,282 B2 | * | 6/2009 | Sugawara | 356/402 |
| 8,305,665 B2 | * | 11/2012 | Sakamoto et al. | 358/518 |
| 2002/0169576 A1 | * | 11/2002 | Jensen et al. | 702/107 |
| 2004/0004731 A1 | * | 1/2004 | Itagaki | 358/1.9 |
| 2005/0052654 A1 | * | 3/2005 | Gila et al. | 356/443 |
| 2005/0206928 A1 | * | 9/2005 | Itagaki | 358/1.9 |
| 2006/0221340 A1 | * | 10/2006 | Viturro et al. | 356/402 |
| 2008/0260242 A1 | * | 10/2008 | MacKinnon et al. | 382/162 |
| 2008/0266216 A1 | * | 10/2008 | Choi | 345/77 |
| 2009/0180927 A1 | * | 7/2009 | Petruno et al. | 422/56 |
| 2009/0190126 A1 | * | 7/2009 | Martinez | 356/243.5 |

* cited by examiner

Primary Examiner — Gregory J Toatley
Assistant Examiner — Dominic J Bologna

(57) ABSTRACT

In one example, the article includes instructions for illuminating a color patch with a first illumination intensity, capturing a first color measurement of the color patch, adjusting the first illumination intensity to a second illumination intensity based on the first color measurement, illuminating the color patch with the second illumination intensity, and capturing a second color measurement. In one example, the system discloses a light source illuminates a color patch with a first illumination intensity, a color measurement module captures a first color measurement of the color patch, wherein the color measurement module causes the light source to adjust the first illumination intensity to a second illumination intensity based on the first color measurement, and wherein the color measurement module captures a second color measurement of the color patch. In one example, the method discloses blocks for effecting the article and system.

13 Claims, 4 Drawing Sheets

ARTICLE, SYSTEM, AND METHOD FOR COLOR MEASUREMENT

BACKGROUND OF THE INVENTION

Brief Background Introduction

Customers of Print Service Providers (PSPs), and other industrial color manufacturers, are increasingly requiring more stringent levels of color accuracy from their production workflows, so as to ensure that the product color that was ordered is the product color which is delivered. Such color accuracy is also important when industrial providers, such as PSPs, implement their own quality control procedures for identifying potential problems that might degrade their product color output.

Accurately measuring color involves many steps, and managing them efficiently is complex. Further improvements in accurately measuring color are desired.

BRIEF DESCRIPTION OF THE DRAWINGS

Some examples of the invention are described in the following figures.

DETAILED DESCRIPTION

Color measurement in Commercial Print Automation systems is a complex endeavor, especially with such a wide gamut of possible colors ranging from purest whites to deepest blacks.

Attempting to perform color measurement over such a wide range of colors using a fixed intensity illumination source involves some compromises and tradeoffs that can affect color measurement accuracy at either end of the color spectrum.

For example, setting an illuminating light source's intensity too high could result in over illumination, saturating calibration and color measurement sensors, and thereby resulting in decreased color measurement accuracy. Similarly, setting an illuminating light source's intensity too low could result in under illumination, where a color measurement signal from a dark color is difficult to distinguish from the color sensor's noise floor (e.g. it has a lower signal-to-noise ratio), again resulting in decreased color accuracy.

The present invention addresses and remedies many, if not all, of the concerns discussed above.

Some of the advantages of the present invention include an improved color measurement algorithm which is based on the color being measured, and thus enables a more accurate color measurement. "Color accuracy" can be quantized using a color difference formula, such as: delta-E, CMC, delta-Lab, or delta-LCH. When a color difference formula is used to define "color accuracy", a lower "color difference" value translates into a more accurate color measurement.

The algorithm increases color measurement accuracy by dividing the color measurement process into at least two phases. In the first phase, an initial color measurement is taken under a first illumination intensity, resulting in an initial color value. In the second phase, the intensity of the light source is modified based on the initial color value, so that when a second color measurement is taken, the measured color value will be more accurate and repeatable.

Details of the present invention are now discussed.

Figure 1:
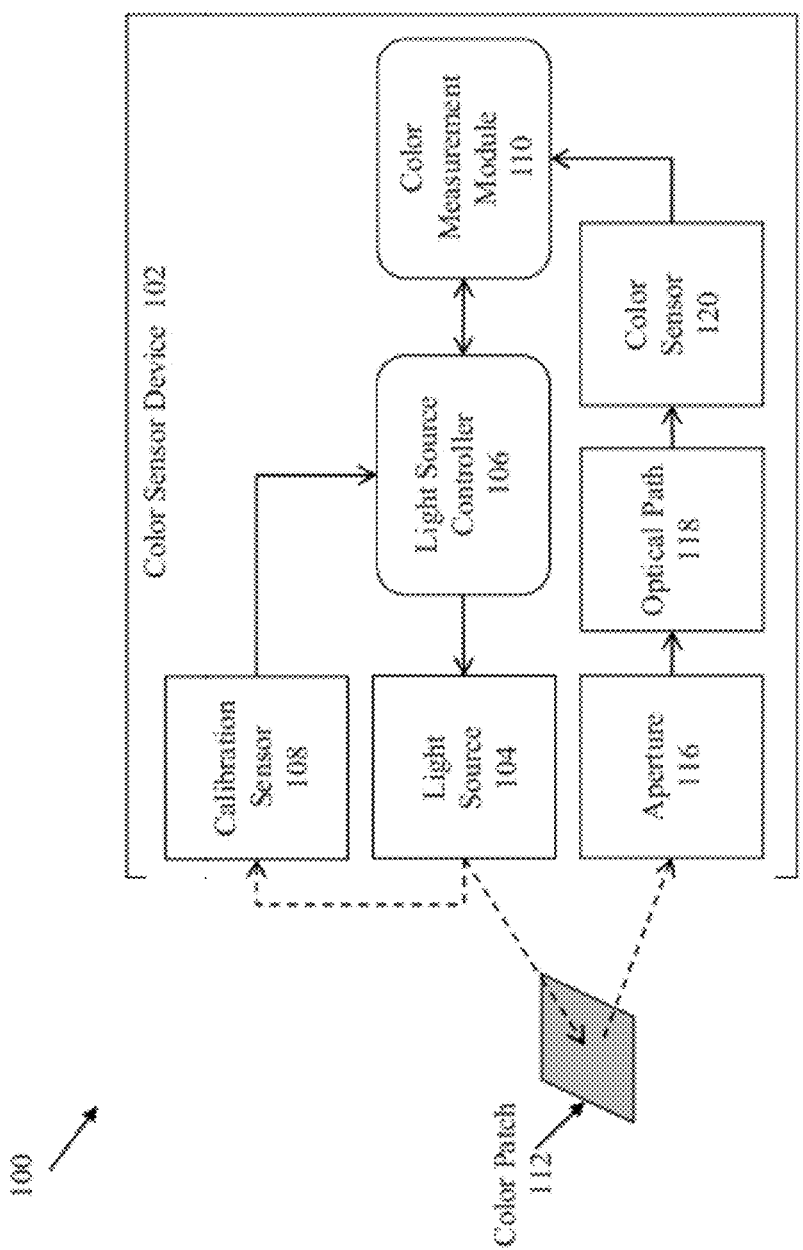
FIG. 1 is a dataflow diagram of one example of a system for color measurement.

FIG. 1 is a dataflow diagram of one example of a system 100 for color measurement. The system 100 includes a color sensor device 102 which performs a color measurement on a color patch 112. The color patch 112 can be any sort of media, sample, surface, tile, paper stock, finish, film, photo, etc. A light color patch is herein defined to include a set of higher-reflectance or higher-transmissiveness color, up to and including a theoretical perfect reflector. A dark color patch is herein defined to include a set of lower-reflectance or lower-transmissiveness color, including a theoretical black-body radiation cavity. "Color" is herein defined to include, not only visible light, but other frequencies throughout the electromagnetic spectrum, including ultraviolet and higher frequencies, as well as infra-red and lower frequencies.

The color sensor device 102 includes a light source 104. The light source 104 generates a light "intensity" which illuminates the color patch 112 and can be controlled. As is discussed later, should the system 100 determine that the color patch 112 is a lighter color, then the intensity of the light source 104 is reduced. Whereas, if the system 100 determine that the color patch 112 is a darker color, then the intensity of the light source 104 is increased.

In one example of the present invention, the light source 104 illuminates the color patch 112 primarily with "visible" light wavelengths. However, in other examples of the present invention, the light source 104 can illuminate the color patch 112 with "ultra-violet" and shorter wavelengths, or "infra-red" and longer wavelengths.

The light source 104 effects illumination using 6 LEDs of varying wavelengths positioned at a 45° angle with respect to a 0° aperture 116, within the color sensor device 102. Light from each illumination LED travels in roughly the same optical path, so as to form a reasonably tight illumination spot on the color patch 112 whose color is to be measured. Each of the illumination LEDs have a predetermined color accuracy specification.

A portion of the illumination from the light source 104 is directed toward a calibration sensor 108. The calibration sensor 108 is used to remove/normalize color measurement signal fluctuations during operation of the color sensor device 102.

The color sensor device 102 includes a light source controller 106. The light source controller 106 varies the illumination intensity output of the light source 104. The light source controller 106 also limits the light source 104 to a maximum illumination intensity level to ensure that the calibration sensor 108 will not go into saturation. In saturation, the calibration sensor 108 output becomes non-linear and may degrade color measurement accuracy.

In one embodiment, the light source controller 106 performs an initialization routine on the light source 104 and the calibration sensor 108. The initialization routine sequentially turns-on and varies the power of each of the light source's 104 LEDs, and the calibration sensor 108 measures the intensity level of each light source 104 LED at the various power levels. Using this data, the light source controller 106 then equalizes each of the LED's power output with each other. Once equalized, the light source controller 106 can uniformly increase or decrease the intensity of the light source 104 in response to commands from a color measurement module 110. With this data, the light source controller 106 can also ensure that the calibration sensor 108 does not go into saturation.

In addition to the aperture 116 mentioned above, the color sensor device 102 also includes: an optical path 118, a color sensor 120, and a color measurement module 110. In response to an "acquisition request", the color measurement module 110 effects a set of processes to capture a set of color measurement data. The "acquisition request" itself can be generated in response to a variety of stimuli, including: a button-press, a triggering event, or a command received from another computer or controller.

The color measurement module 110 operates the light source controller. 106 to illuminate the color patch 112, so that the color sensor device 102 receives light from the light source 104 through the aperture 116 and optical path 118, which is then translated by the color sensor 120 into data which the color measurement module 110 can process.

In one embodiment of the present invention, color measurement is effected by measuring an amount of light reflected by the color patch 112. Reflectance is generally defined as a percentage of electromagnetic radiation that is reflected from an object. In other embodiments of the invention, however, color measurement can be effected by measuring an amount of electromagnetic radiation transmitted through the color patch 112, in which case the light source 104 is placed opposite the aperture 116 with the color patch 112 passing between the light source 104 and the aperture 116.

More specifics on how the color measurement module 110 manages the acquisition of color measurement data is discussed in detail later in this specification.

The light source 104, aperture 116, and optical path 118 together form a substantial part of the optical geometry of the color sensor device 102. While the ISO standard (e.g. ISO 13655) for certain color sensors specifies a 45°/0° measuring geometry (i.e. circular illumination 110 at 45° and a measurement aperture 108 placed at 0°), exactly how that ISO standard is optically and technologically implemented can vary substantially. The aperture 116 permits a portion of the illumination reflected by or transmitted through the color patch 112 to reach the color sensor 120.

The optical path 118 routes the light passed by the aperture 116 through a set of lenses, filters, and optical cavities (e.g. optical wave guide, fiber optics, etc.) to the color sensor 120. In one embodiment integrated plastic optics (e.g. perhaps including a Fresnel lens) are used to achieve 45° illumination and 0° imaging by the color sensor 120.

The color sensor 120 converts the optical reflectance or transmitted signal, received through the aperture 116 and optical path 118, into one or more electrical signals. The color sensor 120 can be a densitometer, a colorimeter, a spectrophotometer, or other type of detection apparatus. The output of the color sensor 120 can be unfiltered; however, the color sensor 120 dynamic range is improved by filtering the color sensor's 120 outputs.

The specifics on how the color measurement module 110 manages the acquisition of color measurement data is now discussed in detail.

In response to the acquisition request, mentioned above, the color measurement module 110 effects the following sequence of events. First, to help reduce background light and electronic noise, an ambient light measurement is taken with the light source 104 turned off.

Next, the color measurement module 110 instructs the light source controller 106 to initialize the light source 104 to a first illumination intensity. This initial intensity is selected to ensure that neither the calibration sensor 108 nor the color sensor 120 will be saturated when the first color measurement is made by the color measurement module 110.

The initial intensity level can be selected in many different ways. For instance, the initial intensity level can be set to a highest intensity level that will not put either sensor 108, 120 into saturation, even if the color patch 112 is a perfect reflector. Or the initial intensity level can be set to a lower intensity level well short of sensor 108, 120 saturation, even if the color patch 112 is a perfect reflector.

The initial intensity level can also be set to a highest intensity level that will not put either sensor 108, 120 into saturation over an anticipated/predetermined range of color patch 112 colors and surfaces. The anticipated range, in one example, is obtained through prior knowledge about the surface finish of the paper stock upon which the color patch 112 is applied, and/or the color saturation of the color patch 112 itself, before any color measurements are taken. For example, prior knowledge that color patch 112 paper stock is a high-gloss photo paper, suggests that the reflected illumination will be higher and thus the initial intensity level should be lower. On the other hand, prior knowledge that color patch 112 paper stock is a rough, matte type and/or that the color patch 112 color is dark and perhaps includes saturated areas, suggests that the reflected illumination will be lower and thus the initial intensity level should be increased.

In one embodiment, the system 100 is optimized to measure a certain set of darker colors, so the first intensity level is set to a relatively high level. Then when the occasional light color needs to be measured, the intensity level is briefly decremented to increase color accuracy for those occasional light colors, before being increased again for the nominally expected dark colors.

The light source 104 then illuminates the color patch 112 with the first illumination intensity. As mentioned above, in one embodiment the light source 104 can be positions so that the illuminating light is reflected from the color patch 112. While in another embodiment, the light source 104 can be positions so that the illuminating light is transmitted through the color patch 112.

Next, the color measurement module 110 captures a first color measurement of the color patch 112 using the color sensor 120. In an example embodiment where the light source 104 includes six LEDs, the color patch 112 is illuminated sequentially by each of the six LEDs in the light source 104 and color sensor 120 data is collected from each individual LED illumination. The resulting six sets of color data captured are then computationally combined by the color measurement module 110, yielding the first color measurement.

The color sensor device 102 can be configured to acquire either one color measurement or multiple color measurements in response to any given triggering event. Multiple color measurement acquisitions are useful for high-speed applications, such as a need to take color measurements in quick succession on an operating web-press where color patches are printed in a regular sequence, and need to be constantly monitored. Additional data buffering capability can be added to the color sensor device 102 as required to handle this functionality. If multiple color measurements are acquired, the corresponding data can be averaged into a single color measurement.

Based on this first color measurement, the color measurement module 110 instructs the light source controller 106 to adjust the first illumination intensity to a second illumination intensity. The color measurement module's 110 instruction may be either to increase, decrease, or not change the intensity of the light source 104. For example, increasing the light intensity can help increase the color measurement accuracy of darker colors, while decreasing the light intensity can help increase the color measurement accuracy of lighter colors. In other cases, keeping the light intensity constant, may be best for color accuracy.

Exactly how the color measurement module 110 instructs the light source controller 106 to modify the intensity of the light source 104 based on the first color measurement can take many forms. In a first example embodiment, the instructions include a binary color scale (e.g. light/dark), with a corresponding binary tuning of the light source 104 intensity levels (e.g. just a high/low intensity level). For example, if the first color measurement indicates a color darker than a single threshold, then the light source 104 intensity is increased to a predetermined higher intensity level; and if the first color measurement indicates a color lighter than the single threshold, then the light source 104 intensity is decreased to a predetermined lower intensity level.

In a second example embodiment, the instructions include a lookup table having a set of color ranges, which maps color measurements falling into each color range, to a corresponding light source 104 intensity level. In a third example embodiment, the instructions include an equation/formula which for each color measurement, calculates a corresponding light source 104 intensity level.

Thus, if the first color measurement indicates that the color patch 112 is darker, the color measurement module 110 will command the light source controller 106 to further increase the light intensity. How far the light intensity is increased depends upon the light source 104 output, the saturation intensity of the calibration sensor 108 and the saturation intensity of the color sensor 120. In one embodiment, the light intensity is increased to a level close to saturating either one or both of the sensors 108, 120. However, in another embodiment a greater margin, further away from any possible saturation level, is allowed for.

If the first color measurement indicates that the color patch 112 is lighter, the color measurement module 110 commands the light source controller 106 to decrease the light intensity. How far the light intensity is decreased depends upon how much into saturation the first illumination intensity put either the calibration sensor 108 and/or the color sensor 120.

In some example embodiments, the light source controller 106 ensures that the calibration sensor 108 does not become saturated; and, the color measurement module 110 ensures that the color sensor 120 does not become saturated, either of which would negatively affect the accuracy of the color measurement. Saturation of the calibration sensor 108 is a potentially limiting constraint as the light source 104 intensity level is increased to better measure darker colors. While, saturation of the color sensor 120 is a potentially limiting constraint when a lighter color is measured, but the light source 104 intensity level is too great, perhaps since a darker color had just previously been measured. Thus when measuring lighter colors the color sensor 120 saturates at a lower light intensity level than when measuring darker colors.

The color measurement module 110 then commands the light source controller 106 to set the light source 104 to the second illumination intensity. Next, the color measurement module 110 captures a second color measurement of the color patch 112 using the color sensor 120.

Due to light source 104 modification from the first illumination intensity to the second illumination intensity, the second color measurement has a higher color signal-to-noise ratio, thereby increasing the color accuracy and repeatability as compared to the first color measurement. Repeatability is defined as, given a same set of initial conditions, the same color result is obtained each time a measurement is taken; and the higher the color signal-to-noise ratio, the better the repeatability.

By increasing the intensity level on a darker color patch 112, the strength of the color signal from the color sensor 120 increases relative to the color sensor's 120 noise floor (e.g. the color sensor's 120 "signal-to-noise ratio" is higher), as long as the color sensor 120 and calibration sensor 108 do not go into saturation. For a lighter color patch 112, better color accuracy (e.g. a smaller "delta-E") is achieved at a lower light source 104 intensity level which avoid saturating the color sensor 120.

A theoretical example of the present invention in operation is now provided. In this example, the light source 104 intensity ranges from 0 to 10, and the calibration sensor 108 goes into saturation at an intensity level "8". The example begins with the first illumination intensity is set to level "5". The "actual" color patch 112 whose color is to be measured is, in this example, a "darkest red".

Data collection begins, and the color measurement module 110 receives a $1^{st}$ color measurement @ intensity level "2", and the color measurement module 110 computes that the color patch 112 color is "red". The color measurement module 110, in this theoretical example is programmed to "incrementally" adjust the light source 104 intensity until saturation of the calibration sensor 108 is detected, so the color measurement module 110 sets the intensity level to "6" and captures a $2^{nd}$ color measurement. Using this new $2^{nd}$ color measurement data, the color measurement module 110 then computes that the color patch 112 color is "maroon". Since "maroon" is consistent with "red", the color measurement module 110 does not detect any saturation, and so increases the intensity level to "7" and captures a $3^{rd}$ color measurement. The color measurement module 110 then computes that the color patch 112 color is a "darkest red". Again, since a "darkest red" color is consistent with "maroon" and "red" the color measurement module 110 continues to increase the intensity level to "8" and captures a $4^{th}$ color measurement. The color measurement module 110 then computes that the color patch 112 color is a "light purple". In this $4^{th}$ color measurement, note that the calibration sensor 108 had gone into saturation and was Corrupting the color measurement. The color measurement module 110 is programmed to detect this "unexpected" "light purple" color measurement which is inconsistent with the "red", "maroon" and "darkest red" color measurement progression. Thus the color measurement module 110 detects this inconsistency and in response selects the previous color measurement (i.e. the $3^{rd}$ color measurement of "darkest red") as the most accurate measurement.

Figure 2:
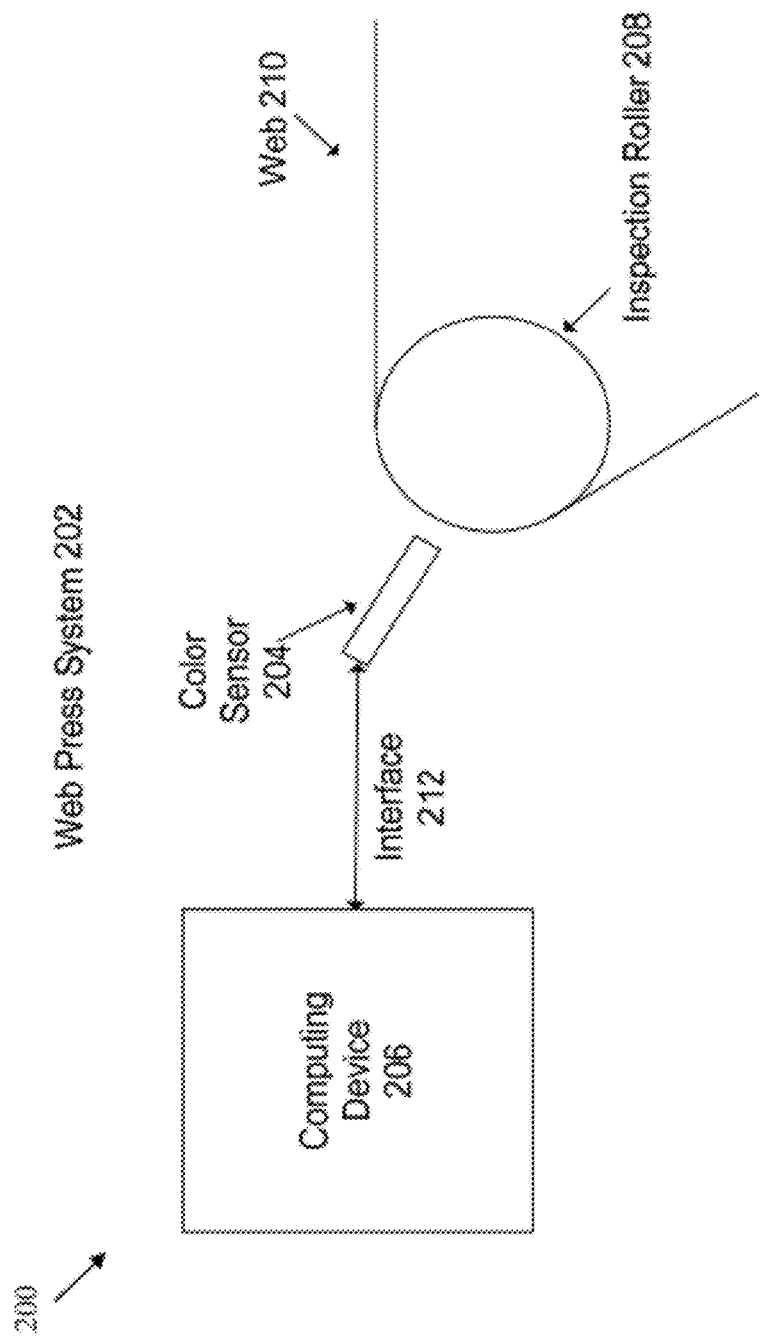
FIG. 2 is a pictorial diagram of one example embodiment of the system.

FIG. 2 is a pictorial diagram of one example embodiment 200 of the system 100. A color sensor 204, such as described in FIG. 1, is positioned over an inspection roller 208 carrying a moving web 210.

The color sensor 204 is held at a known or measured height above the web 210, and the inspection roller 208 is designed to constrict and/or damp the z-axis motion (i.e. height) of the web 210 beneath the color sensor 204. The web 210 itself can be any material, such as a stream of paper being printed and/or finished in a web-press system 202. The color sensor 204 is operated by a computing device 206, through a wired or wireless interface 212.

The computing device 206 calibrates the color sensor 204 and sends a trigger signal to the color sensor 204 for capturing a set of color measurement data. The computing device 206 then receives, post-processes, and perhaps analyzes the captured color measurement data to provide either real-time color control for the web-press system 202 or to collect color quality control data for presentation to a print services customer.

Figure 3:
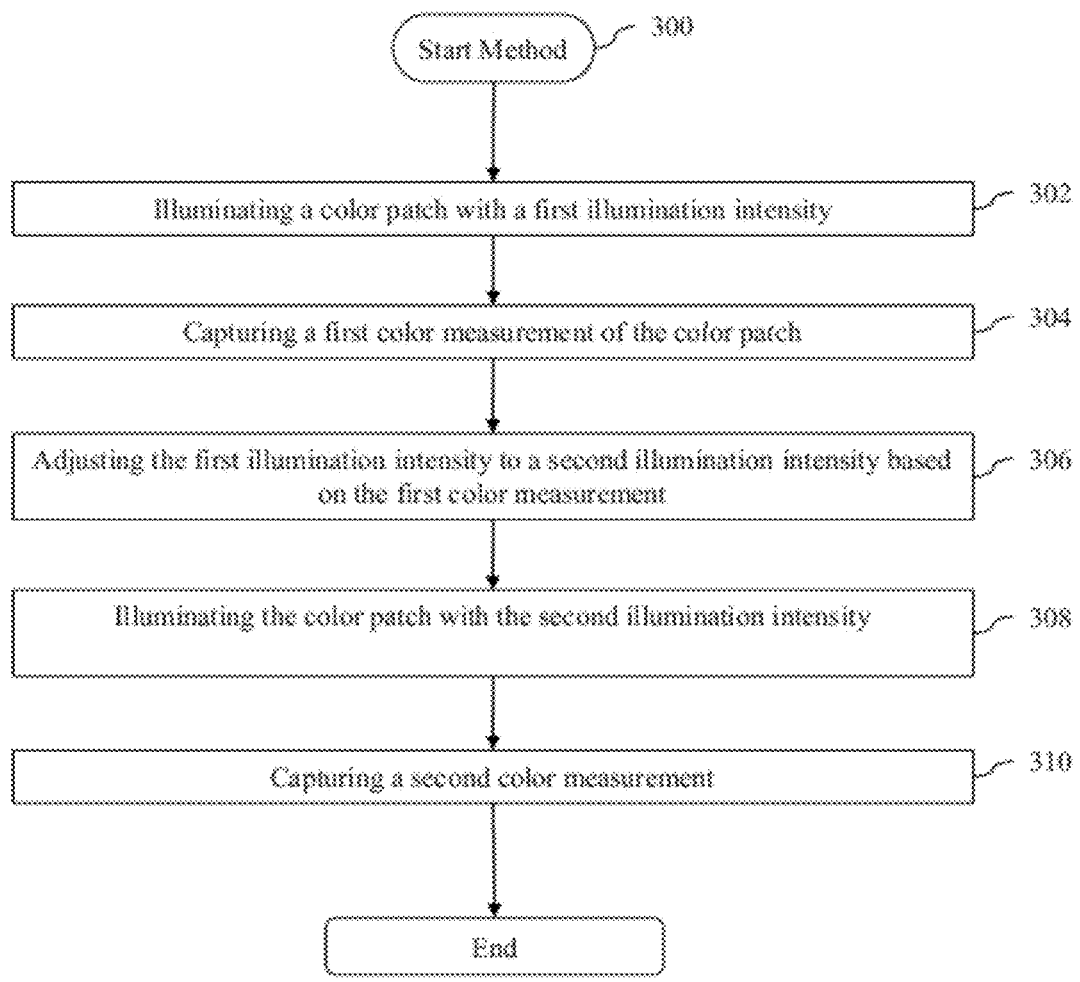
FIG. 3 is a flowchart of one example of a method for color measurement.

FIG. 3 is a flowchart of one example of a method 300 for color measurement. Those skilled in the art will recognize that while one example of the present invention's method is now discussed, the material in this specification can be combined in a variety of ways to yield other examples as well. The method next discussed is to be understood within a context provided by this and other portions of this detailed description.

The method 300 begins in block 302, by illuminating a color patch with a first illumination intensity. Next, in block 304, a first color measurement of the color patch is captured. In block 306, the first illumination intensity is adjusted to a second illumination intensity, based on the first color measurement. Then in block 308 the color patch is illuminated with the second illumination intensity. In block 310 a second color measurement is captured.

Figure 4:
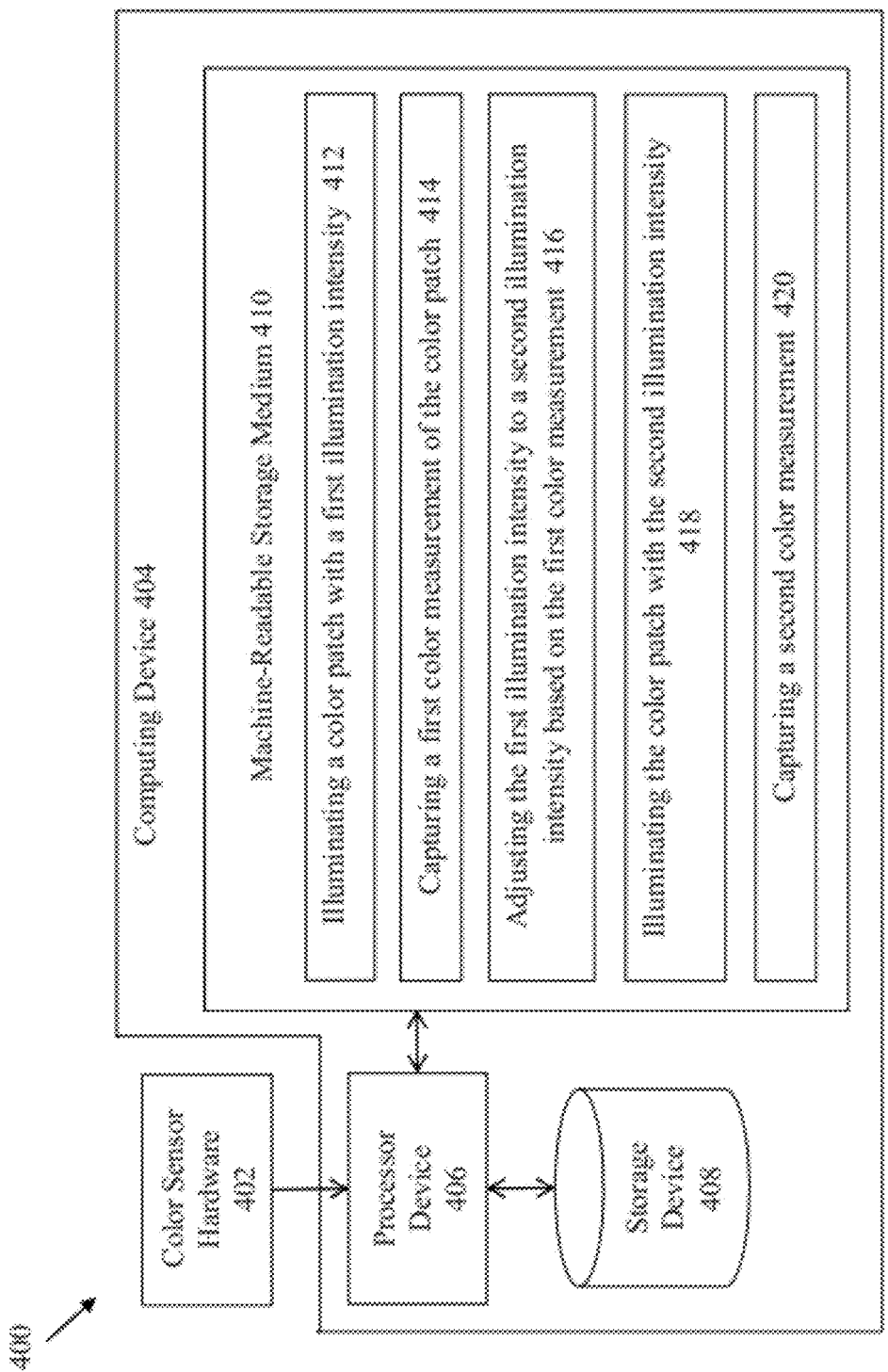
FIG. 4 is a dataflow diagram used by another example embodiment of the system.

FIG. 4 is a dataflow diagram 400 used by another example embodiment 400 of the system 100. The diagram 400 shows color sensor hardware 402 interfacing with a computing device 404. The computing device 404 includes a processor device 406, a storage device 408, and a machine-readable storage medium 410. Instructions within the machine-readable storage medium 410 control how the processor device 406 interacts with the color sensor hardware 402, using data within the storage device 408.

The instructions stored in the machine-readable storage medium 410 include: illuminating a color patch with a first illumination intensity 412, capturing a first color measurement of the color patch 414, adjusting the first illumination intensity to a second illumination intensity based on the first color measurement 416, illuminating the color patch with the second illumination intensity 418, and capturing a second color measurement 420.

The processor device 406 (such as a central processing unit, CPU, microprocessor, application-specific integrated circuit (ASIC), etc.) controls the overall operation of the storage device 408 (such as random access memory (RAM) for temporary data storage, read only memory (ROM) for permanent data storage, firmware, flash memory, external and internal hard-disk drives, and the like).

The processor device 406 communicates with the storage device 408 and algorithms using the bus and performs operations and tasks that implement one or more blocks of the flow diagrams discussed herein. The storage device 408, for example, stores applications, data, programs, algorithms (including software to implement or assist in implementing examples in accordance with the present invention) and other data.

As used herein and in the claims, the following words are defined as follows:

The term "printing device" is an electronic device that performs one or more functions of printing, scanning, and copying. In one example, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "printer" is not limited to just standard printers, but includes various other types of electronic devices that perform one or more functions such as printing, scanning, or copying.

The term "file" or "a set of files" refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

In one example, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations thereof. It is intended that the following claims cover such modifications and variations as fall within the true spirit and scope of the invention.

What is claimed is:

1. An article comprising at least one device-readable storage medium containing executable device instructions for color measurement, further comprising:
   illuminating a color patch with a first illumination intensity;
   capturing a first color measurement of the color patch;
   adjusting the first illumination intensity to a second illumination intensity based on the first color measurement;
   illuminating the color patch with the second illumination intensity; and
   capturing a second color measurement.

2. The instructions of claim 1, wherein adjusting includes one from a group including:

increasing the second illumination intensity relative to the first illumination intensity;
decreasing the second illumination intensity relative to the first illumination intensity; and
keeping the second illumination intensity same as the first illumination intensity.

3. The instructions of claim 1, wherein adjusting includes:
increasing the second illumination intensity relative to the first illumination intensity, if the first color measurement indicates that the color patch is darker than a predetermined color.

4. The instructions of claim 1, wherein adjusting includes:
decreasing the second illumination intensity relative to the first illumination intensity, if the first color measurement indicates that the color patch is lighter than a predetermined color.

5. The instructions of claim 1:
wherein capturing the first color measurement includes, capturing multiple color measurements and averaging into the first color measurement; and
wherein capturing the second color measurement includes, capturing multiple color measurements and averaging into the second color measurement.

6. A system for color measurement, comprising:
a light source illuminates a color patch with a first illumination intensity;
a color measurement module captures a first color measurement of the color patch;
wherein the color measurement module causes the light source to adjust the first illumination intensity to a second illumination intensity based on the first color measurement; and
wherein the color measurement module captures a second color measurement of the color patch.

7. The system of claim 6:
further comprising a threshold color value;
wherein the color measurement module causes the light source to increase the first illumination intensity to the second illumination intensity, if the first color measurement indicates a color darker than the threshold color value; and
wherein the color measurement module causes the light source to decrease the first illumination intensity to the second illumination intensity, if the first color measurement indicates a color lighter than the threshold color value.

8. The system of claim 6:
further comprising a color look-up table, having a set of color ranges; and
wherein the color measurement module causes the light source to set the second illumination intensity relative to the first illumination intensity, depending upon which color range the color measurement matches with.

9. The system of claim 6:
further comprising a light intensity equation, having a color measurement variable; and
wherein the color measurement module inputs the color measurement into the equation and causes the light source to set the second illumination intensity equal to the equation's result.

10. The system of claim 6, further comprising:
a calibration sensor; and
a light source controller limiting the illumination intensity to prevent the calibration sensor from going into saturation.

11. The system of claim 6, further comprising:
a color sensor; and
a light source controller limiting the illumination intensity to prevent the color sensor from going into saturation.

12. The system of claim 6, further comprising:
a calibration sensor;
a color sensor; and
a light source controller which initializes the light source to the first illumination intensity, ensuring that neither the calibration sensor nor the color sensor will be saturated even if the color patch is a theoretical perfect reflector.

13. The system of claim 6, further comprising:
a calibration sensor;
a color sensor; and
a light source controller which initializes the light source to the first illumination intensity, ensuring that neither the calibration sensor nor the color sensor will be saturated over an predetermined range of color patch colors.

* * * * *